US006486867B1

United States Patent
Kopp et al.

(12) United States Patent
(10) Patent No.: US 6,486,867 B1
(45) Date of Patent: Nov. 26, 2002

(54) TELECOMMUNICATION TERMINAL AND DEVICE FOR PROJECTING RECEIVED INFORMATION

(75) Inventors: Dieter Kopp, Hemmingen (DE); Thomas Hörmann, Grossbottwar (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 08/868,310

(22) Filed: Jun. 3, 1997

(30) Foreign Application Priority Data

Jun. 4, 1996 (DE) ......................................... 196 22 314

(51) Int. Cl.[7] ................................................ G09G 3/34
(52) U.S. Cl. ...................................................... 345/108
(58) Field of Search ........................... 345/108, 84, 85, 345/175, 179, 180; 455/566, 550, 556, 557; 348/789, 838; 353/122

(56) References Cited

U.S. PATENT DOCUMENTS 3,775,005 A * 11/1973 Szabo ........................... 353/42
4,449,247 A * 5/1984 Waschka, Jr. .................. 455/9

(List continued on next page.)

FOREIGN PATENT DOCUMENTS

| DE | 3131226 | 2/1983 |
|---|---|---|
| DE | 19528967 | 4/1996 |
| DE | 19528424 | 11/1996 |
| EP | 3887613 | 9/1988 |
| EP | 0352914 | 1/1990 |
| EP | 0596558 | 5/1994 |
| EP | 0631445 | 12/1994 |
| EP | 0663770 | 7/1995 |
| EP | 0673161 | 9/1995 |
| EP | 0710019 | 5/1996 |
| EP | 0770896 | 5/1997 |
| EP | 0831352 | 3/1998 |

OTHER PUBLICATIONS ntz, Bd 47, 1994, H.4, age 287.
JP6–268763, A., In: Patents Abstracts of Japan, E–1648. Dec. 10, 1994, vol. 18, No. 675.
"Image Projectors Overtake Large Displays", in Elektronik, vol. 2/1996 by H. Lemme, Franzis–Verlag, Feldkirchen, Germany, pp. 56 to 70.
"Das Personal—Display Private Eye", In: radio, fernsehen, elektronik, Berlin 39, 1990, 10, pp. 642–643.
Prospekt: "PC Powerlight der Fa.", Proki Demolux, Dreieich, 1995.

*Primary Examiner*—Vijay Shankar
(74) *Attorney, Agent, or Firm*—Ware, Fressola, Van Der Sluys & Adolphson LLP

(57) ABSTRACT

There is known a telecommunication terminal with a miniature display for received, visually perceptible information, such as, for example, fax messages. In addition, a device is known for projecting computer images or TV images, the device comprising a so-called DMD chip (Digital Mirror Device). It is proposed to improve the aforedescribed telecommunication terminal (MS) by providing the terminal with projection means (DMD, FL) which can basically only be used for the device described above. In addition, the device described above is improved by being provided with an interface circuit for connection to a telecommunication terminal. Accordingly, the conventional means known in the field of computer technology and TV technology for projecting images are now used in or for a telecommunication terminal, especially in a mobile radio telephone (MS). With the received image data, images can be projected directly onto a projection screen, for example, onto a wall. Several people can view the images simultaneously. An output device, such as, for example, a printer for fax messages, is not required.

4 Claims, 2 Drawing Sheets

U.S. PATENT DOCUMENTS

| | | | |
|---|---|---|---|
| 4,846,694 A | * 7/1989 | Eehardt | 434/365 |
| 4,856,863 A | * 8/1989 | Sampsell et al. | 350/96.16 |
| 5,339,116 A | 8/1994 | Urbanus et al. | |
| 5,418,546 A | * 5/1995 | Nakagakiuchi et al. | 345/85 |
| 5,467,215 A | 11/1995 | Lebby et al. | |
| 5,490,009 A | 2/1996 | Venkateswar et al. | |
| 5,504,504 A | * 4/1996 | Markandey et al. | 345/214 |
| 5,506,597 A | * 4/1996 | Thompson et al. | 345/85 |
| 5,568,967 A | * 10/1996 | Sikkens et al. | 362/328 |
| 5,592,188 A | * 1/1997 | Doherty et al. | 345/84 |
| 5,594,468 A | * 1/1997 | Marshall et al. | 345/158 |
| 5,613,146 A | * 3/1997 | Gove et al. | 395/800 |
| 5,658,063 A | * 8/1997 | Nasserbakht | 353/122 |
| 5,738,429 A | * 4/1998 | Tagawa et al. | 353/122 |
| 5,841,411 A | * 11/1998 | Francis | 345/58 |

\* cited by examiner

TELECOMMUNICATION TERMINAL AND DEVICE FOR PROJECTING RECEIVED INFORMATION

TECHNICAL FIELD

The invention relates to a telecommunication terminal for receiving visually perceptible information and for projecting the received information onto a projection screen. It is also directed to a device for projecting visually perceptible information onto a projection screen with an interface circuit for connection to another device receiving the visually perceptible information.

BACKGROUND OF THE INVENTION

From EP 352914A2 there is known a telecommunication terminal with a means for receiving and for representing visually perceptible information. The telecommunication terminal described therein is a telephone with a miniature display for received information, for example, for received alphanumeric characters or for received fax messages. The miniature display used therein comprises an assembly of light emitting diodes (LEDs) which are viewed with a magnifying optical system, whereby the miniature display appears to the viewer like a large-area image display (virtual image display). With this conventional telecommunication terminal, only one person can view the visual information, namely only the subscriber. He/she has to position the miniature display in front of either one of his/her eyes. The miniature display is integrated into the handset rendering the handset rather heavy and bulky.

From the article by H. Lemme "Image Projectors Overtake Large Displays," published on pages 56 to 70 in the technical journal "Elektronik", Volume 2/1996, Franzis-Verlag, Feldkirchen, Germany, there is known a device with means for projecting visually perceptible information onto a projection screen. This device comprises a so-called DMD chip (Digital Mirror Device), i.e., an integrated circuit with a reflecting optical switching matrix consisting of 1280× 1024 micromirrors. The micromirrors are individually suspended from semi-gimbal mounts and are deflected by control signals (see FIGS. 4 and 9 therein) for reflecting impinging light and projecting the light onto a projection screen. In the article, there is described that the DMD chip is used in laser projection systems for computer images or TV images.

SUMMARY OF THE INVENTION

The invention is based on the understanding that the telecommunication terminal described above can be improved by providing the terminal with projection means that comprise a circuit with an illuminatable and reflecting optical switching matrix and at least one optical lens for projecting the light reflected by the optical switching matrix onto the projection screen, which can only be used for the above-described device.

In addition, the invention is based on the concept that the above-described device can be improved by providing the device with an interface circuit adapted for connection to a telecommunication terminal.

Accordingly, the projection means which have been known for quite some time in the fields of computer technology and TV technology (see the article referenced above by H. Lemme, page 57, 2. paragraph), are now used in or for a telecommunications terminal for overcoming the disadvantages described at the beginning.

BRIEF DESCRIPTION OF THE DRAWINGS

The invention will be described hereinafter with reference to two embodiments to be taken in conjunction with the following schematic drawings.

BEST MODE FOR CARRYING OUT THE INVENTION

Figure 1:
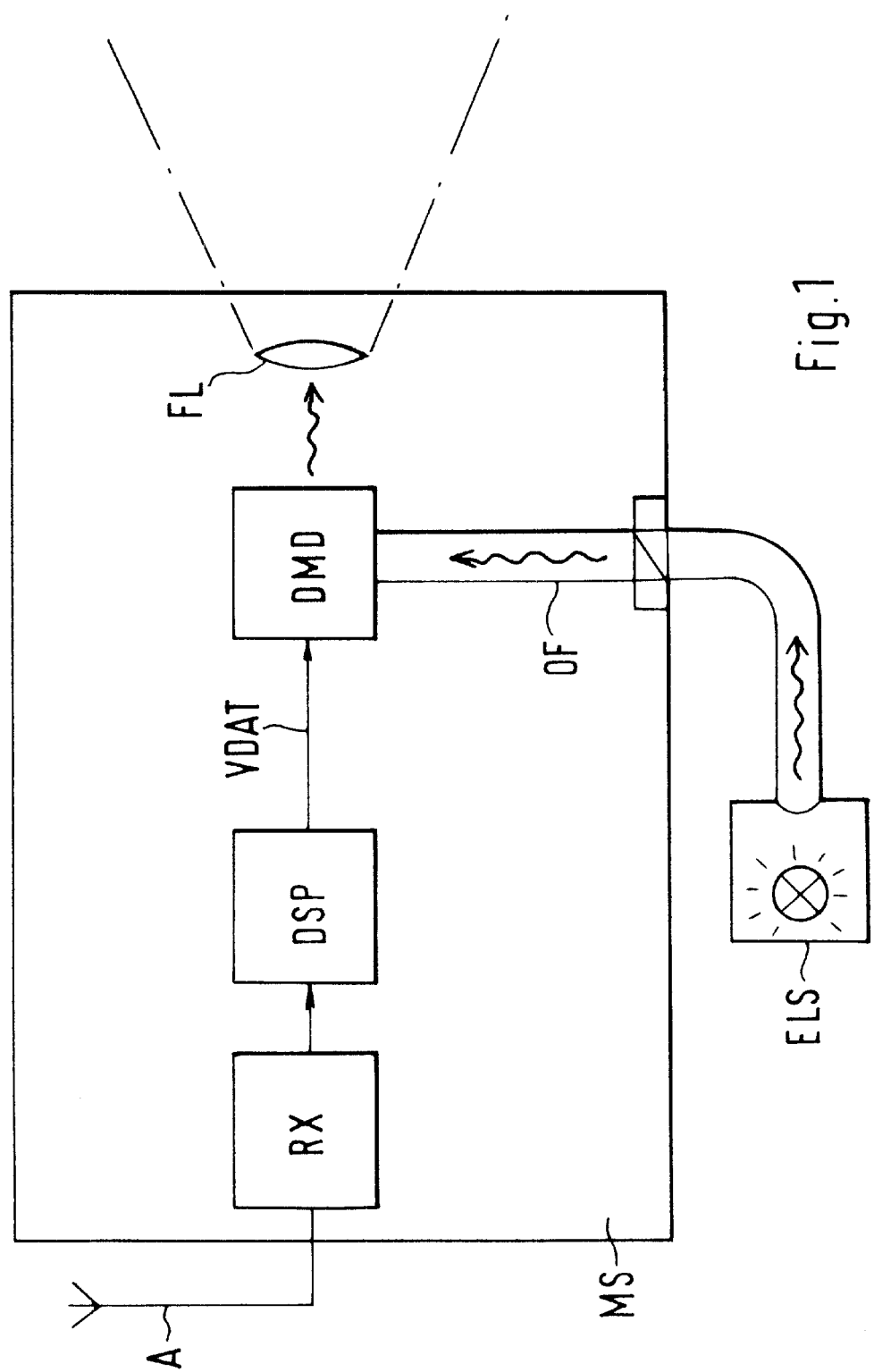
FIG. 1 showing a telecommunication terminal.

FIG. 1 shows a telecommunication terminal MS which in the present example is a radio telecommunication terminal according to the GSM standard. This radio telecommunication terminal MS, in the following shortened to "mobile device", comprises an antenna, to which a receiver RX, a digital signal processor DSP, and a circuit DMD are connected, in that order. In addition, the mobile device MS comprises an optical waveguide OF extending from a connection socket on the housing of the mobile device to the circuit DMD, and an optical lens FL.

The radio signals received via the antenna and the receiver RX are processed by the digital signal processor in the baseband. The received radio signals contain information VDAT to be represented visually with the help of the circuit DMD and the lens FL which are described hereinafter. In this example, the information VDAT corresponds to digital image data for controlling the circuit DMD which here is a so-called "digital mirror device". The circuit DMD comprises a reflecting optical switching matrix with 640× 480 micromirrors arranged in a regular pattern. Light from an external light source ELS is supplied to these micromirrors via the optical waveguide OF. The circuit DMD controlled by the digital signal processor DSP effects a deflection of the micromirror as a function of the applied image data VDAT. With the help of the mirror and based on the image data VDAT, a black and white image is projected onto a projection screen (not shown). The micromirrors irradiated by the light source ELS reflect the light—depending on their deflection—in the direction of an optical axis on which the convex lens FL is located. Each of the micromirrors corresponds to one pixel on the projection screen; by addressing the respective micromirror, this pixel can be switched to be light or dark.

In this example, black and white light still images are projected, such as fixed messages according to the so-called "GSM Short Message Service" or faxed messages. It is also conceivable, however, to project moving images and color images; this, however, would require a higher transmission bandwidth on the radio channel and better signal processing. It is also conceivable to achieve a higher image resolution by using more than 640×480 micromirrors. For controlling the micromirrors, faster processors can also be used in lieu of a DSP, such as, for example, microprocessors with RISC architecture. It is advantageous, if possible, to use the processor capacity available for processing the voice signals also for controlling the DMD.

The mobile device depicted in FIG. 1 has a simple design. As a result of the externally connected light source, it can be made very compact. Suitable as a light source is, for example, a halogen lamp with a rating of, for example, 100 W. With the above-described projection method, visually perceptible information that has been received, can be projected directly onto a projection screen, for example, onto a wall. In this way, several viewers can simultaneously view the received information. A display device, such as, for example a printer for fax messages, is thereby obviated.

Figure 2:
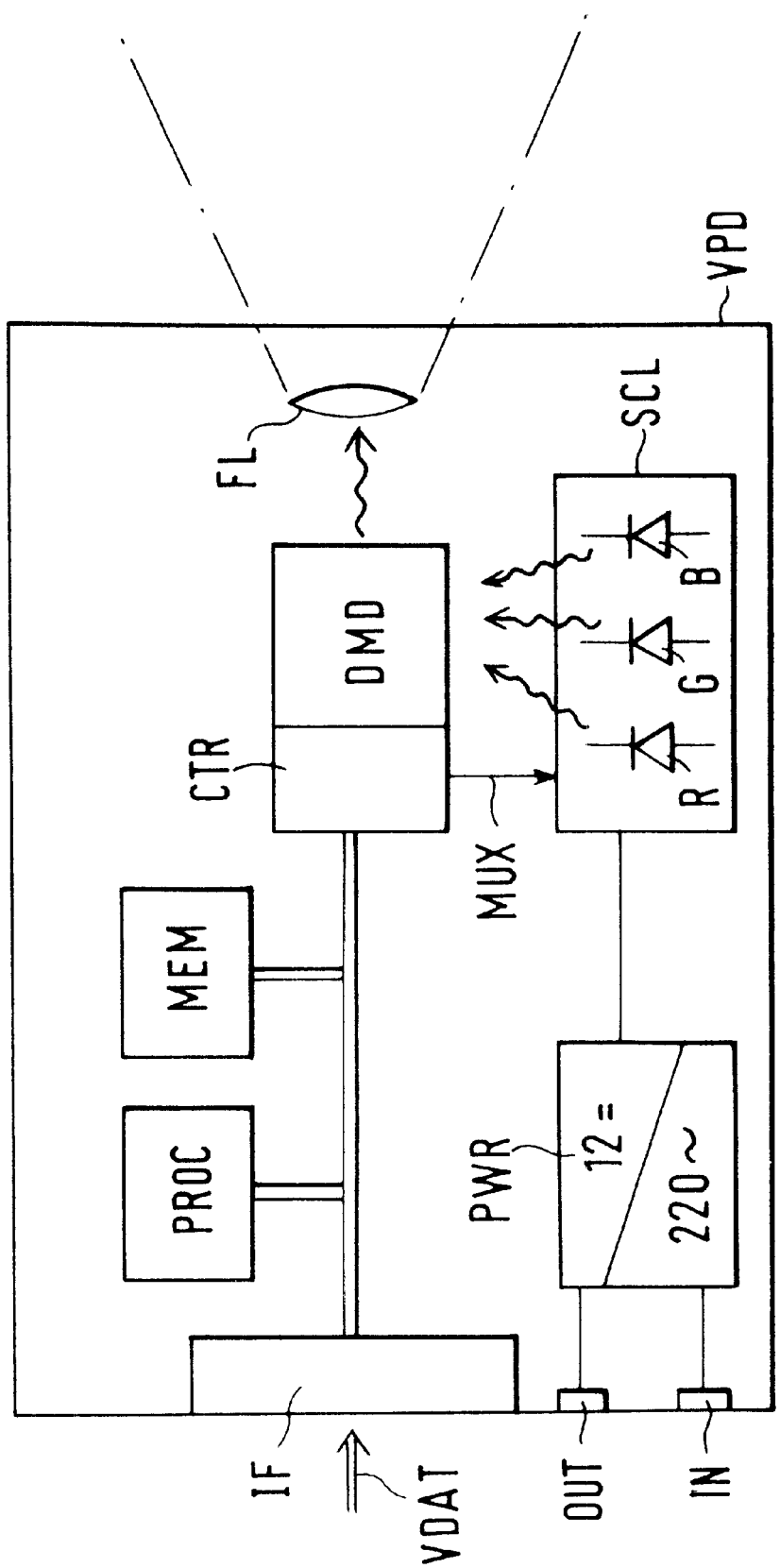
FIG. 2 showing a device for use with a conventional telecommunication terminal.

In FIG. 2 there is depicted a device VPD comprising the following means for projecting visually perceptible information: aside from the circuit which has already been described, and the lens, a controller CTR for the circuit, and a laser assembly SCL with three lasers having different colors, R, G and B. In addition, the assembly VDP comprises a processors PROC, a memory MEM, and an interface circuit IF which are connected to each other and to the controller CTR via a data bus. The device comprises a power supply PWR for supplying power to the laser assembly SCL. The line voltage of 220 V is applied to the input of the power supply. By transforming and rectifying the line voltage in the power supply PWR, a DC voltage of 12 V for supplying the laser R, G, and B is generated. The three lasers generate light signals of different wavelengths, the first laser R in the red spectral region, the second laser G in the green spectral region, and the third laser B in the blue spectral region. A projection of color images with the above-described elements will now be described in greater detail hereinafter:

The device VPD is connected via the interface circuit IF to a telecommunication terminal, for example to an ISDN telephone set. The image data VDAT originating from this telecommunication terminal are received via the interface surface IF and processed in the processor PROC mentioned above as well as temporarily stored in memory MEM. The controller CTR now controls both the circuit DMD and the laser assembly SCL in multiplex operation. For this purpose, the controller is connected to the laser assembly via a signal link MUX. The color separations, i.e. red, green, and blue separation, are sequentially generated and projected. For the red color separation, the first laser diode R transmits red light to the switching matrix contained in the circuit DMD. The switching matrix is addressed by the image data for the red color separation, and, through the reflection discussed above, a red color separation is projected to the projection screen in form of an image. Subsequently, the green color separation is projected by addressing and controlling the green second laser diode G with the image data for the green color separation. The blue color separation is processed thereafter accordingly.

The three color separations are sequentially multiplexed at a rate of 50 Hz for projecting a color image onto the projection screen. For implementing the multiplex method described above, the color separations are temporarily stored in the memory MEM. In addition, color separations initially not processed for projection (still image storage), can also be stored.

The described device VPD is intended to be connected to an ISDN telephone. In this example, the data VDAT are transmitted using the ISDN standard on two channels, each channel having a bandwidth of 64 KB/s. This makes possible a simple projection of moving color images. The required bandwidth can be reduced and/or the image quality can be improved by employing algorithms for image data compression, such as, for example, the MPEG algorithm. The described device is particularly suited for videoconferencing or telemetry applications, for example, in the field of telemedicine.

The device of the invention could also be designed as a device for a mobile radio telephone. In this case, the interface circuit would be designed, for example, as a so-called PCMCIA interface.

What is claimed is:

1. A telecommunication terminal (MS) comprising:

first means (RX) for receiving visually-perceptible information (VDAT)

second means including at least one optical lens (FL) for projecting the received information (VDAT) onto a projection surface; and a processor for signal processing of voice data, characterized in that the second means (DMD,FL) comprising a circuit (DMD) having an illuminatable and reflective optical switching matrix, and in that the at least one optical lens (FL) projects the light reflected by the optical switching matrix onto the projection surface, and further in that the optical switching matrix is a surface having N times M (N and M intergers) micro-mirrors, which are individually suspended by a semi-gimbal mount and which are deflected by means of the received information, and further in that existing processor capacity of the processor for signal processing of voice data can be used to control the circuit (DMD).

2. A telecommunication terminal (MS) according to claim 1, characterized in that the terminal is a radio telecommunication terminal and that the first means comprises a radio receiver (RX), which receives short messages in order to project them onto the projection surface by means of the circuit (DMD).

3. A telecommunication terminal according to claim 1, characterized in that the terminal is a wire line telecommunication terminal and that the first means comprise a receiver for fax messages and/or video messages.

4. A telecommunication terminal (MS) according to claim 1, characterized in that it contains an optical fiber (OF), which guides light from an external light source (ELS) onto the micro-mirrors of the switching matrix.

* * * * *

UNITED STATES PATENT AND TRADEMARK OFFICE
CERTIFICATE OF CORRECTION

PATENT NO.   : 6,486,867 B1
DATED        : November 26, 2002
INVENTOR(S)  : Kopp et al.

It is certified that error appears in the above-identified patent and that said Letters Patent is hereby corrected as shown below:

Column 4,
Line 16, after "(VDAT)" -- ; -- should be inserted.

Signed and Sealed this

Thirteenth Day of May, 2003

JAMES E. ROGAN
*Director of the United States Patent and Trademark Office*